US010471672B2

(12) United States Patent
Park

(10) Patent No.: US 10,471,672 B2
(45) Date of Patent: Nov. 12, 2019

(54) SHOES MIDSOLE FORMING APPARATUS AND SHOES MIDSOLE MANUFACTURED USING THE SAME

(71) Applicant: Young-Soul Park, Seoul (KR)

(72) Inventor: Young-Soul Park, Seoul (KR)

(*) Notice: Subject to any disclaimer, the term of this patent is extended or adjusted under 35 U.S.C. 154(b) by 223 days.

(21) Appl. No.: 15/712,907

(22) Filed: Sep. 22, 2017

(65) Prior Publication Data

US 2018/0009187 A1 Jan. 11, 2018

Related U.S. Application Data

(63) Continuation of application No. PCT/KR2016/003014, filed on Mar. 24, 2016.

(30) Foreign Application Priority Data

Mar. 24, 2015 (KR) .................. 10-2015-0040479
Mar. 24, 2016 (KR) .................. 10-2016-0035064

(51) Int. Cl.
*B29C 33/44* (2006.01)
*B29C 33/34* (2006.01)
(Continued)

(52) U.S. Cl.
CPC ............ *B29D 35/128* (2013.01); *A43B 13/14* (2013.01); *A43B 13/184* (2013.01);
(Continued)

(58) Field of Classification Search
CPC ......... B29C 44/58; B29C 44/34; B29C 33/22; B29C 33/44; B29C 44/583; B29D 35/12;
(Continued)

(56) References Cited

U.S. PATENT DOCUMENTS 3,719,965 A * 3/1973 Chevallereau ......... A43B 13/04
12/146 B
4,445,284 A * 5/1984 Sakutori ................ A43B 7/081
36/28
(Continued)

FOREIGN PATENT DOCUMENTS

KR 20040096914 A * 11/2004
KR 20060080083 A * 7/2006
KR 20120128782 A * 11/2012

OTHER PUBLICATIONS

International Search Report; PCT/KR2016/003014; dated Jul. 12, 2016.

*Primary Examiner* — Joseph S Del Sole
*Assistant Examiner* — Emmanuel S Luk
(74) *Attorney, Agent, or Firm* — Jefferson IP Law, LLP

(57) ABSTRACT

A midsole molding apparatus which enables production of a high-quality midsole is provided. The apparatus includes a through hole, which passes laterally through a midsole used for a shoe, to be integrally formed, preventing traces of forming the through hole from being left in the through hole and on the periphery of the through hole and a shaft mold crossing the inner space of upper and lower molds, forming extending portions such that the ends of the shaft mold extend beyond the boundary of the inner space, and seating the extending portions in press recesses of the upper and lower molds to seal the insides of the molds so as to prevent raw material from leaking from inside the molds when foaming and forming a midsole, to prevent parting lines and burrs from forming on the inner surface of the through hole passing laterally through the midsole.

2 Claims, 18 Drawing Sheets

(51) Int. Cl.
  *B29D 35/12*   (2010.01)
  *B29C 33/22*   (2006.01)
  *B29C 44/58*   (2006.01)
  *A43B 13/14*   (2006.01)
  *A43B 13/18*   (2006.01)
  *A43B 13/20*   (2006.01)
  *B29D 35/00*   (2010.01)
  *B29K 223/00*  (2006.01)
  *B29L 31/50*   (2006.01)

(52) U.S. Cl.
  CPC ............ *A43B 13/206* (2013.01); *B29C 33/22* (2013.01); *B29C 33/44* (2013.01); *B29C 44/58* (2013.01); *B29C 44/583* (2013.01); *B29D 35/0036* (2013.01); *B29D 35/122* (2013.01); *B29K 2223/083* (2013.01); *B29K 2995/0046* (2013.01); *B29K 2995/0094* (2013.01); *B29L 2031/504* (2013.01)

(58) Field of Classification Search
  CPC . B29D 35/122; B29D 35/0036; B29D 35/128
  See application file for complete search history.

(56) References Cited

U.S. PATENT DOCUMENTS

| | | | | |
|---|---|---|---|---|
| 4,754,559 A * | 7/1988 | Cohen | .................. | A43B 13/181 36/25 R |
| 5,435,959 A * | 7/1995 | Williamson | ........ | B29C 33/3878 264/221 |
| 5,461,800 A * | 10/1995 | Luthi | .................. | A43B 13/181 36/114 |
| 5,577,334 A * | 11/1996 | Park | ......................... | A43B 7/14 36/28 |
| 6,132,663 A * | 10/2000 | Johnson | ................ | B29D 35/122 249/91 |
| 6,843,000 B1 * | 1/2005 | Park | ...................... | A43B 13/181 36/29 |
| 7,181,866 B2 * | 2/2007 | Braunschweiler | ....... | A43B 3/24 36/114 |
| 8,557,157 B2 * | 10/2013 | Nakano | ................ | A43B 1/0072 264/244 |
| 9,668,540 B2 * | 6/2017 | Scofield | ................... | A43B 13/186 |
| 2002/0170650 A1 * | 11/2002 | Chi | ......................... | A43B 3/122 156/79 |
| 2006/0110487 A1 * | 5/2006 | Bergmann | ............ | B29C 33/306 425/119 |
| 2007/0193068 A1 * | 8/2007 | Calvano | ............... | B29D 35/128 36/87 |
| 2013/0126075 A1 * | 5/2013 | Jiang | ....................... | B29C 65/02 156/219 |
| 2015/0050379 A1 * | 2/2015 | Ginns | ................ | B29D 35/0018 425/500 |
| 2015/0208755 A1 * | 7/2015 | Rustam | ................... | A43B 5/001 36/127 |
| 2015/0210028 A1 * | 7/2015 | Hansen | ............... | B29C 45/2675 264/244 |
| 2015/0273778 A1 * | 10/2015 | Campos, II | .......... | B29D 35/142 12/142 T |
| 2015/0298413 A1 * | 10/2015 | Yang | .................. | B29D 35/0036 425/183 |
| 2018/0056573 A1 * | 3/2018 | Chang | ................ | B29D 35/0018 |

* cited by examiner

SHOES MIDSOLE FORMING APPARATUS AND SHOES MIDSOLE MANUFACTURED USING THE SAME

CROSS-REFERENCE TO RELATED APPLICATION(S)

This application is a continuation application, claiming the benefit under § 365(c), of an International application filed on Mar. 24, 2016 and assigned application number PCT/KR2016/003014, which claimed the benefit of a Korean patent application filed on Mar. 24, 2015 in the Korean Intellectual Property Office and assigned Serial number 10-2015-0040479 and of a Korean patent application filed on Mar. 24, 2016 in the Korean Intellectual Property Office and assigned Serial number 10-2016-0035064, the entire disclosure of each of which is hereby incorporated by reference.

TECHNICAL FIELD

The present invention relates to a midsole used for a shoe, and more particularly, to a midsole including a through-hole formed through a side thereof.

In detail, the through-hole is integrally formed through a side of the midsole without forming any traces on surrounding portions of the through-hole.

BACKGROUND

In recent years, various designs and functions of shoes are demanded according to the various needs of consumers. Even in the sport industry as well as the outdoor industry, there have been proposed shoes having a light weight as well as a distinctive function.

As a method of lightening a shoe, a midsole may be formed by injection-foaming an EVA material such that the weight of the midsole is lightened.

According to a method of manufacturing a midsole by injection foam molding, after a liquid raw material containing a foaming material is injected into a mold having a size slightly smaller than that of the midsole to be manufactured, heat and pressure are applied to the mold, such that chemical reaction is made inside the mold, thereby performing molding in a shape of a midsole. By opening the mold after a predetermined time period, the molded article in the mold is instantaneously expanded at the same time as the mold is opened, so that a midsole having a desired size is produced. Such a method of manufacturing a midsole through the injection foaming method has been well known in the art and thus, the details will be omitted.

Meanwhile, at present, to pierce the side of a midsole, a midsole which are separated into two pieces of which each or one has a groove formed in a predetermined shape or depth is prepared and then, the pieces of the sole are assembled by means of adhesive or the like, thereby manufacturing a side pierced midsole.

However, according to such a method, since the midsole is implemented by bonding, it is difficult to not only manufacture the midsole but also ensure the quality of the product, and the effect of buffering by the through-hole formed through the side of the midsole is deteriorated.

Therefore, to solve the problem described above, the applicant of the present application had proposed a midsole in which a through-hole is integrally formed at a side thereof, so that the midsole has excellent buffering function and the manufacturing difficulty caused due to adhesion is overcome. (Korean Unexamined Patent Publication No. 10-2013-0027610 A).

However, in the injection foam molding method described above, it is very difficult to smoothly form a through-hole perforated in the lateral direction. The reason is that a shaft mold is required to penetrate through the center of a mold to integrally form the through-hole perforated in the lateral direction in the midsole, and an error occurs in the structure in which the shaft metal mold is closely attached to the inner wall of the mold so that it is difficult to manufacture a complete product.

That is, in order to form the through-hole in the lateral direction of the midsole, the shaft mold for forming the through-hole in the midsole is installed inside the mold for molding the midsole. In the case where the midsole is molded at a constant temperature and pressure, for example, by a foaming method in the state that the shaft mold is installed inside the mold and is not tightly closed to the mold, a gap is generated between the mold and the shaft mold installed inside the mold and the molded material enters the gap, so that the through-holes of the midsole are partially or fully blocked. Thus, a separate processing means is required to remove such a material formed in the gap.

That is, although the injection molding method is characterized in that molding is performed at a very high pressure, when the shaft mold is simply placed to be tightly closed to the inner wall surface of the upper and lower molds, since a gap is formed between the shaft and the inner wall of the mold, the result of molding is not good. Even if a mold is manufactured by precision machining in the production of a mold, a bur is generated in the result of molding.

Therefore, after the molding is completed, the post-processing is necessarily required, so that the mold manufacturing cost is excessive and the production cost of the outsole is increased due to excessive labor as well as excessive working equipment and working time.

In addition, to form the through-hole perforated in the lateral direction of the midsole, the mold opening structure is formed in the same line as the shaft mold installed inside the mold, so that the parting line is exposed on the inner wall of the through-hole of the molded midsole.

Meanwhile, when the midsole is individually molded by injection foam molding, a defect may occur in the midsole. That is, after rapid foaming by the opening of the mold in the production process, the volume is reduced due to the temperature change caused by making contact with external air having a relatively low temperature while being cooled, thereby causing a dimensional defect.

The above information is presented as background information only to assist with an understanding of the present disclosure. No determination has been made, and no assertion is made, as to whether any of the above might be applicable as prior art with regard to the present disclosure.

SUMMARY

To solve the problems described above, one object of the present invention is to improve the completeness of a molded article without a need of post-processing a portion of a through-hole after the completion of molding by preventing a molding trace from being formed on the though-hole and the surrounding portions of the through-hole even though the through-hole is integrally formed in a lateral direction of a midsole.

In addition, another object of the present invention is to allow a pair of midsoles to be manufactured with a single mold such that the manufacturing time of the midsole is reduced and a dimensional defect is prevented from being generated between the pair of midsoles.

To achieve the above-described objects, according to the present invention, there is provides a midsole forming device which includes inner spaces formed by an upper mold and a lower mold and foam-molds a midsole by injecting a raw material into the inner spaces. The midsole forming device includes a shaft mold intersecting the inner spaces of the upper and lower molds; an extension portion provided to the shaft mold, wherein the extension portion is formed on an end portion of a shaft to extend beyond boundaries of the inner spaces of the upper and lower molds; and press grooves formed on the upper and lower molds to surround the extension portion of the shaft mold such that an injection foam molding is performed without generating a parting line and a bur on an inner surface of a through-hole perforated in a lateral direction of the midsole.

According to the midsole forming device of the present invention, by manufacturing the midsole through injection foam molding, it is possible to provide a sole that is lightweight, excellent in impact absorption and excellent in restoring force. In addition, it is possible to provide a high-quality midsole since there is no trace of molding in the through-hole and the surrounding portions of the through-hole even though the through-hole for damping is formed integrally with the midsole.

In addition, the structure of the damping portion provided with the through-hole may be formed in in various shapes such as a bar shape, a ball shape and the like, or in such a shape that a heel does not exist, thereby satisfying both design and functionality.

In addition, since the size of the midsole may be easily adjusted by controlling the amount of the raw material to be injected during molding and the midsole may be manufactured in various sizes besides the standard sizes which are usually used, the inventory burden may be reduced and the satisfaction of the consumers may be improved.

In addition, since a parting line is not formed on the inner surface of the through-hole and any burs do not exist, the durability of the through-hole and the quality of the product may be improved, and since the post-processing of the corresponding part is not necessary in the production process, it is possible to reduce labor and reduce the manufacturing cost of the sole, thereby ensuring price competitiveness.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
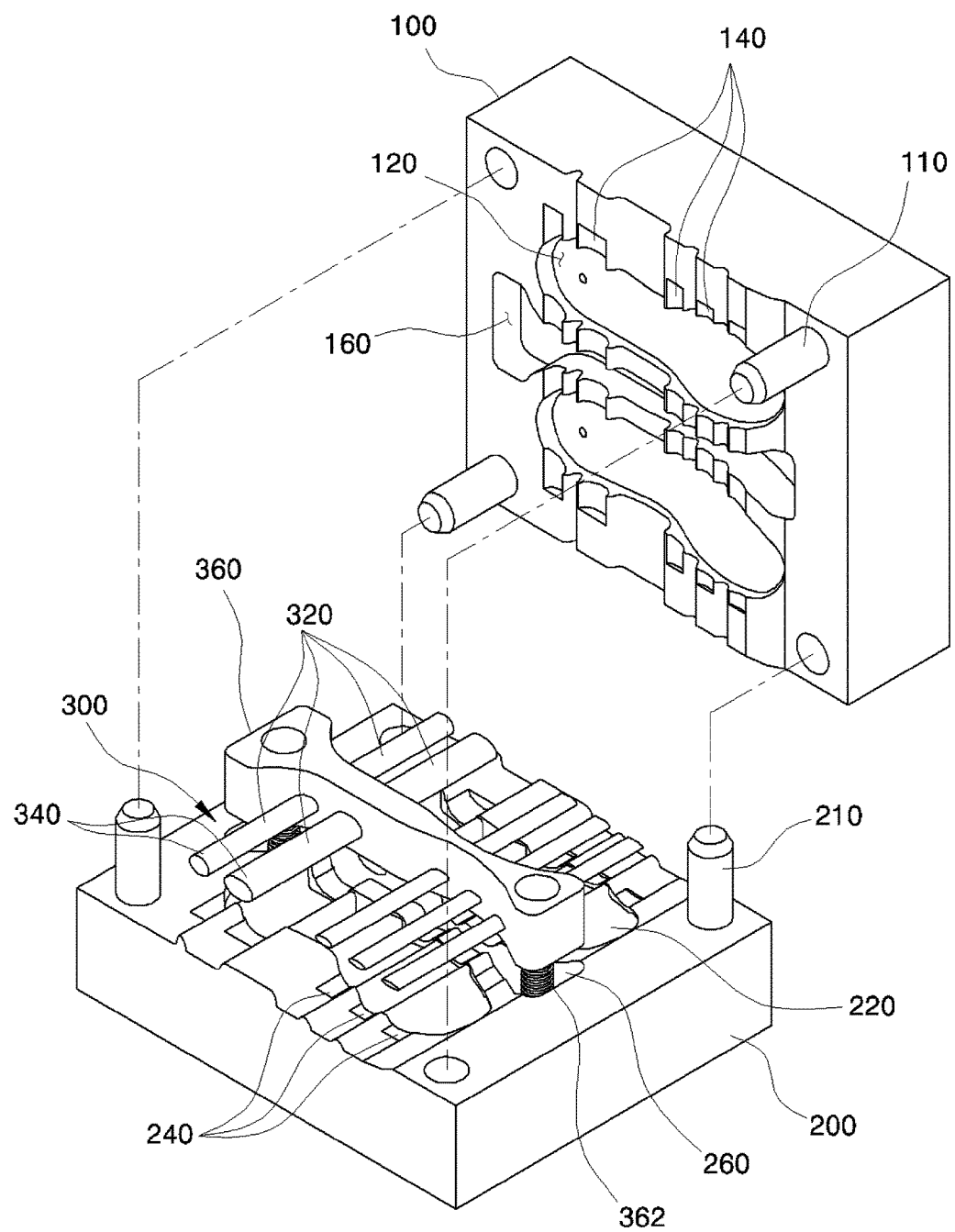
FIG. 1 is an exploded perspective view illustrating a structure of a molding apparatus according to the present invention.
Figure 2:
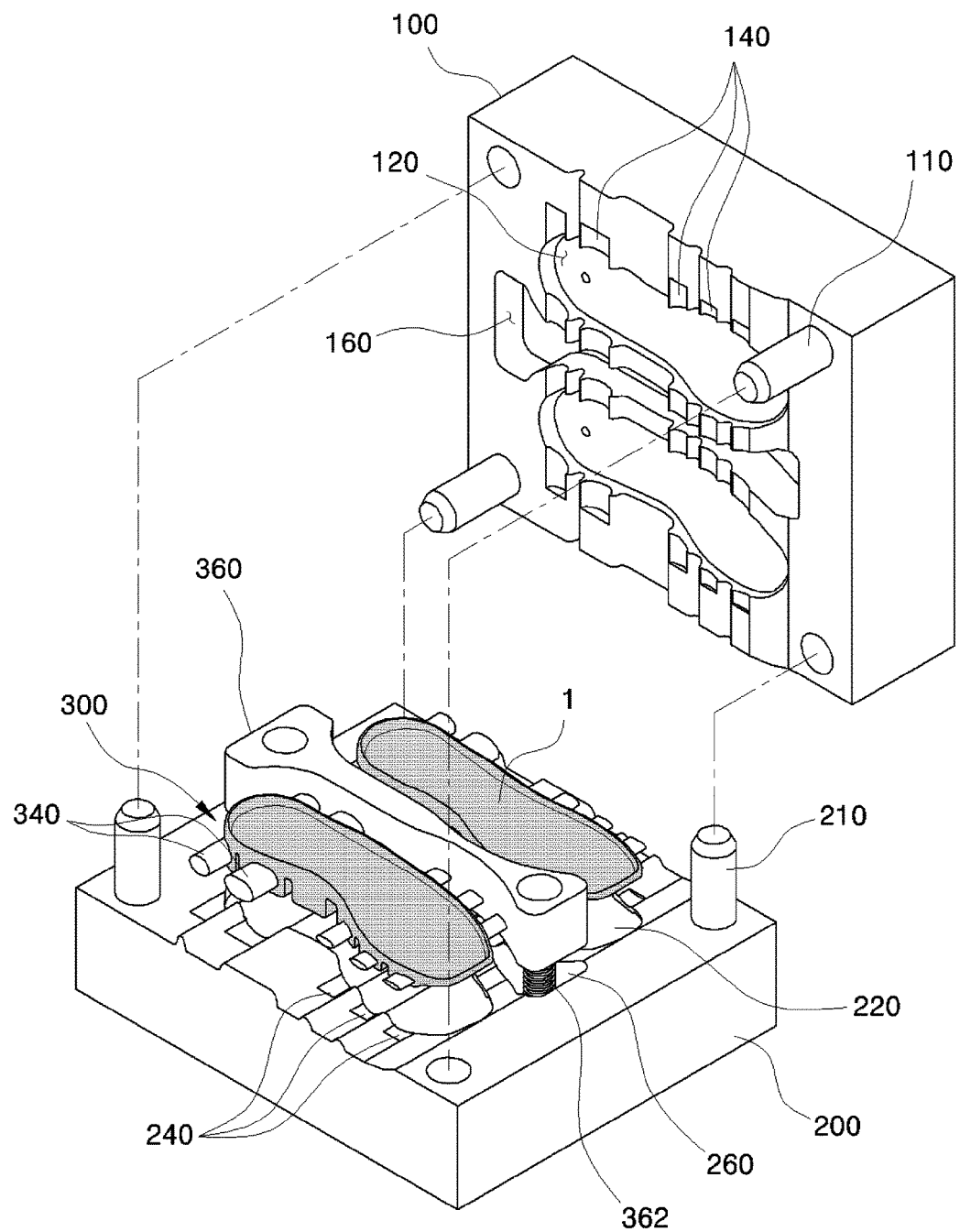
FIG. 2 is a view illustrating an opened mold in a state that a midsole is molded by a molding apparatus according to the present invention.
Figure 3:
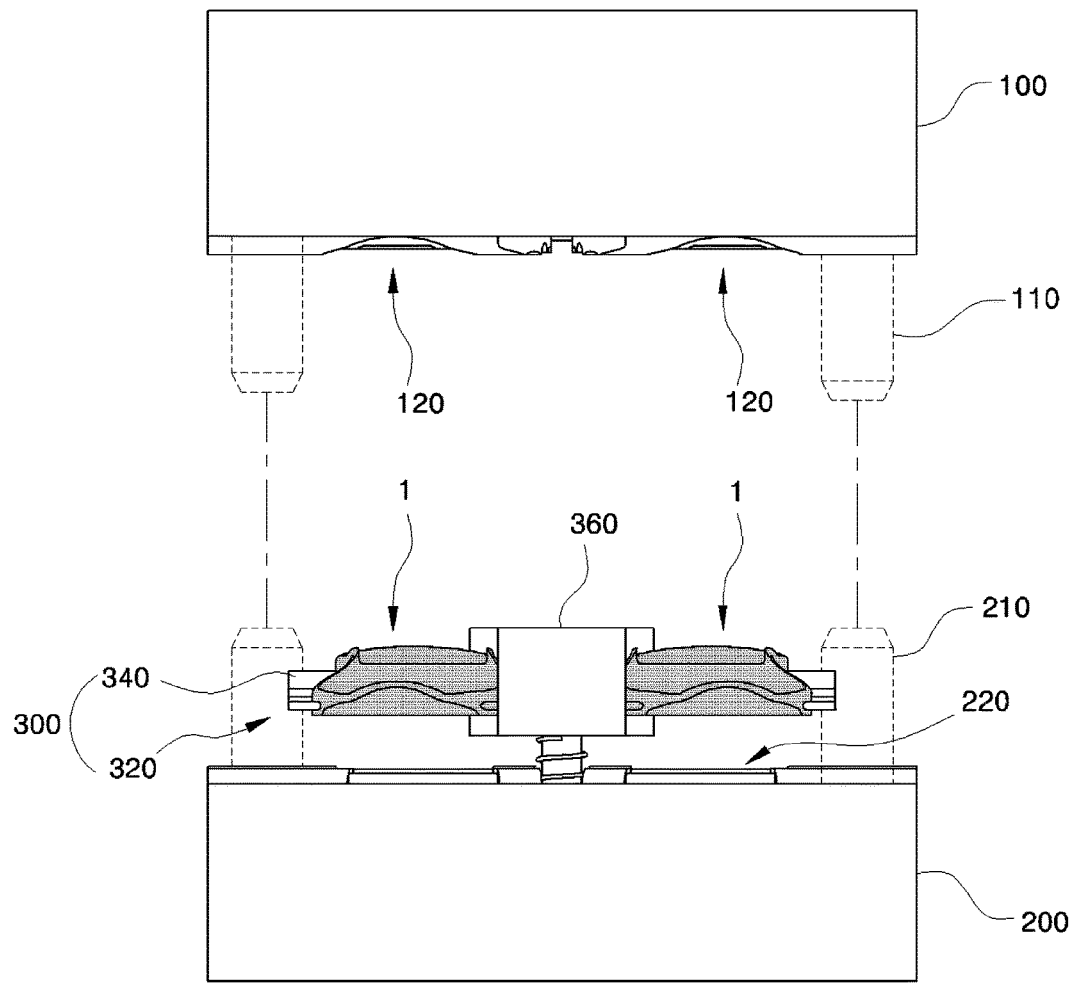
FIG. 3 is a front view of FIG. 2.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to the best mode of the present invention, there is provided a midsole forming device which includes inner spaces 120 and 220 formed by an upper mold 100 and a lower mold 200 and foam-molds a midsole by injecting a raw material into the inner spaces, the midsole forming device including:

a shaft mold 300 intersecting the inner spaces 120 and 220 of the upper and lower molds 100 and 200;

an extension portion 340 provided to the shaft mold 300, wherein the extension portion 340 is formed on an end portion of a shaft 320 to extend beyond boundaries of the inner spaces 120 and 220 of the upper and lower molds 100 and 200; and press grooves 140 and 240 formed on the upper and lower molds 100 and 200 to surround the extension portion 340 of the shaft mold 300 such that an injection foam molding is performed without generating a parting line and a bur on an inner surface of a through-hole perforated in a lateral direction of the midsole.

In addition, there is provided a midsole which includes a heel portion located rearward of a support capable of pressing a concave portion of a sole and a toe portion, and is foam-molded to realize a low weight, wherein the heel portion of the midsole is relatively thicker than the toe portion to endure a load when a shearing force is applied during walking, the midsole including:

recess portions and protrusion portions repeatedly formed on the heel portion;

a though-hole perforated in a lateral direction of the protrusion portion for damping; and an assembly means provided on the toe portion in a planar state to assemble a damping ball which is separately molded.

Hereinafter, the present invention will be described in detail with reference to accompanying drawings as follows.

As shown in FIG. 1, the present invention includes a shaft mold (300) between upper and lower molds 100 and 200. When the upper and lower molds 100 and 200 are engaged with each other for molding, the shaft mold is interposed between the upper and lower molds such that a though-hole 2 perforated in the lateral direction of a midsole 1 may be integrally formed.

Inner spaces 120 and 220 may be formed in the upper and lower molds 100 and 200 to correspond to each other, respectively. The inner space 120 of the upper mold 100 is provided to mold an upper surface of the midsole 1 and the inner space 220 of the lower mold 200 is provided to mold a lower surface of the midsole 1.

The upper and lower molds 100 and 200 may be coupled in position to each other by guide pins 110 and 210. A raw material is injected into the inner space between the upper and lower molds 100 and 200 in the state that the upper and lower molds are closed (shut), such that the midsole 1 is foam-molded.

A shaft mold 300, which is provided to cross the inner spaces 120 and 220 when the upper and lower molds 100 and 200 are closed, may allow a through-hole 2 perforated in the lateral direction of the midsole 1 to be integrally molded when the midsole 1 is molded in the mold.

In this case, the shaft mold 300 may be provided as many as the number of through-holes 2 to be formed in the midsole 1. In the structure of the shaft mold 300, a shaft 320 may be provided to intersect the inner spaces 120 and 220 of the upper and lower molds 100 and 200, and an extension portion 340 may be provided on an end portion of the shaft 320 to extend beyond the boundaries of the inner spaces 120 and 220 of the upper and lower molds 100 and 200.

In addition, press groove 140 and 240 may be formed on the upper and lower molds 100 and 200 to surround the extension portion 340 of the shaft mold 300.

That is, preferably, the shaft 320 is formed in a circular or elliptic shape. An upper surface of the shape 320 is tightly closed to the press groove 140 of the upper mold 100 based on the horizontal center of the shaft 320 and a lower surface of the shape 320 is tightly closed to the press groove 240 of the lower mold 200 based on the horizontal center of the shaft 320, such that the mold is smoothly opened or closed and the molding is performed in the state that the extension portion 340 of the shaft 320 is tightly closed into the press grooves 140 and 240.

Thus, when the midsole 1 is molded, it is possible to prevent the raw material from leaking out due to the foaming pressure inside the mold and to prevent the through-hole 2 from being clogged. In addition, it is possible to prevent the parting line of the mold from occurring on the inner surface of the through-hole 2 and to prevent a bur from being generated on the surface of the midsole.

Meanwhile, when the shaft 320 and the extension portion 340 are formed on a platform 360 that is operated to move up or down, the platform 360 is operated to move up and down when the upper and lower molds 100 and 200 are closed or opened, such that the shaft mold 300 may be separated from the mold.

In this case, the platform 360 may be mounted on the upper or lower mold 100 or 200 such that the plate form 360 is operated to move up and down. The platform 360 may be mounted to have an elastic restoring force by a restoring element 362.

The platform 360 of the shaft mold 300 is mounted on the upper or lower mold 100 or 200 to have the elastic restoring force by the restoring element 362, such that the molded article is separated and protrudes from the upper or lower mold when the mold is opened after molding is completed.

Figure 4:
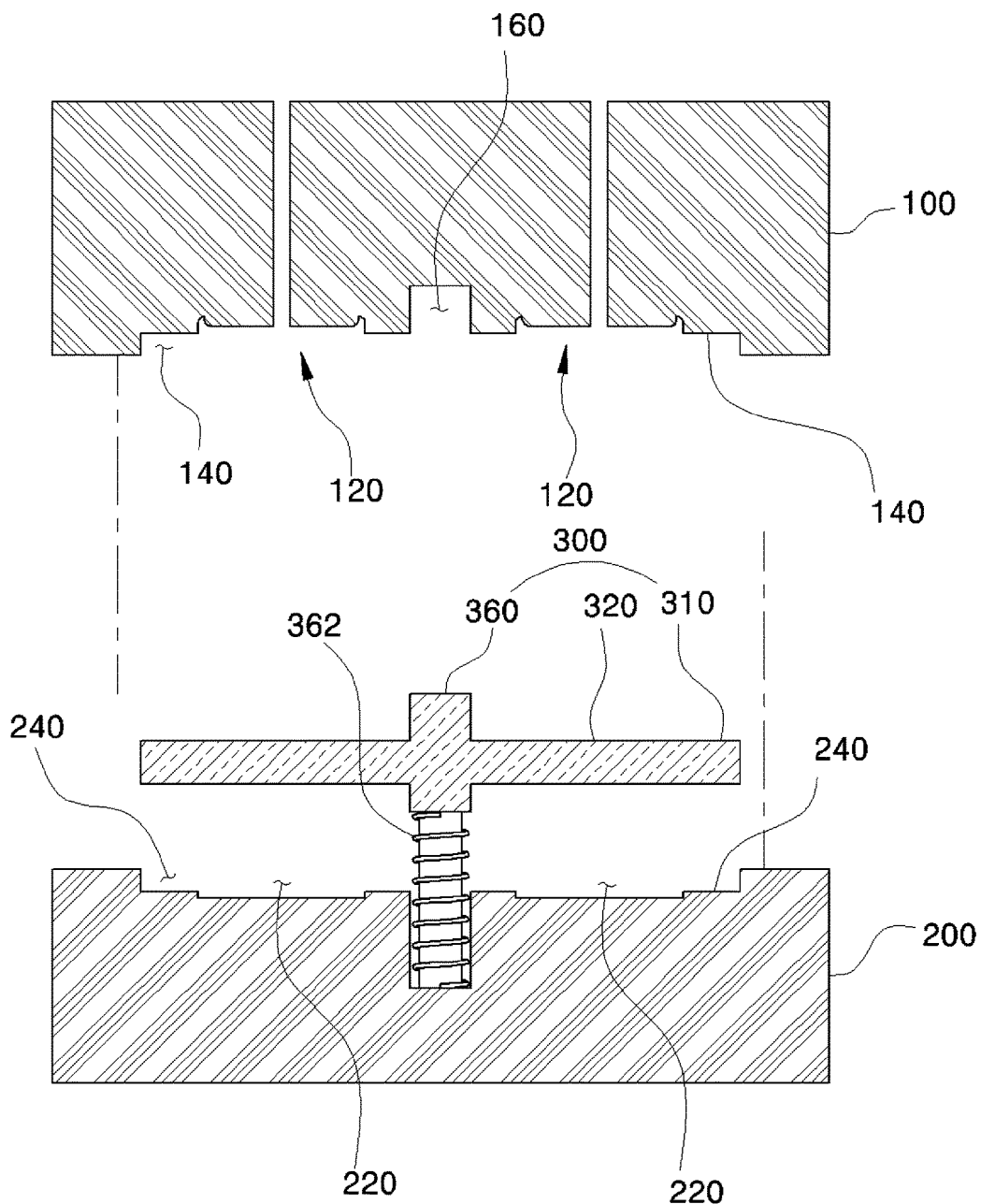
FIGS. 4 to 8 are sectional views illustrating a step of molding a midsole using a molding apparatus according to the present invention.
Figure 5:
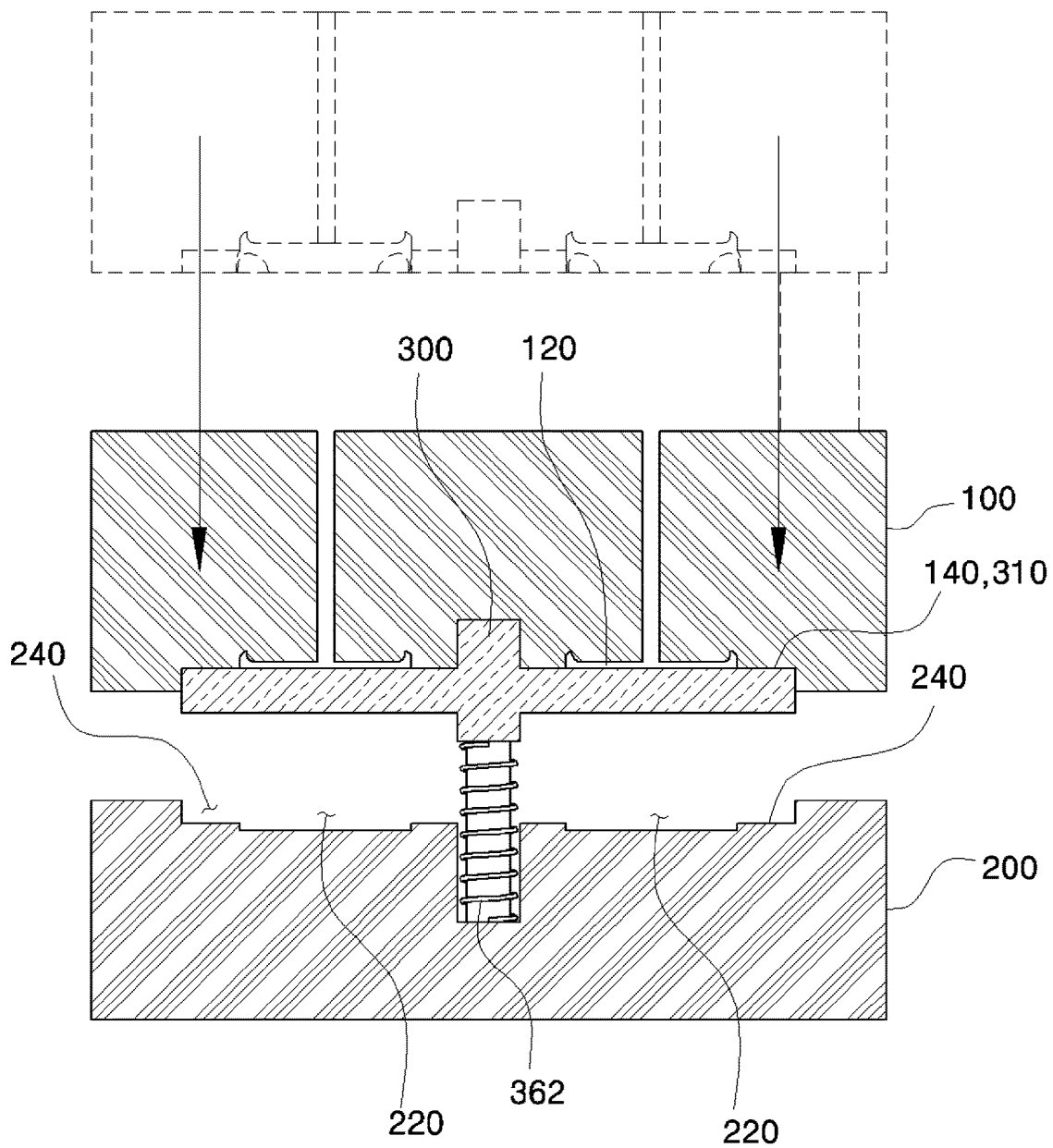
Figure 6:
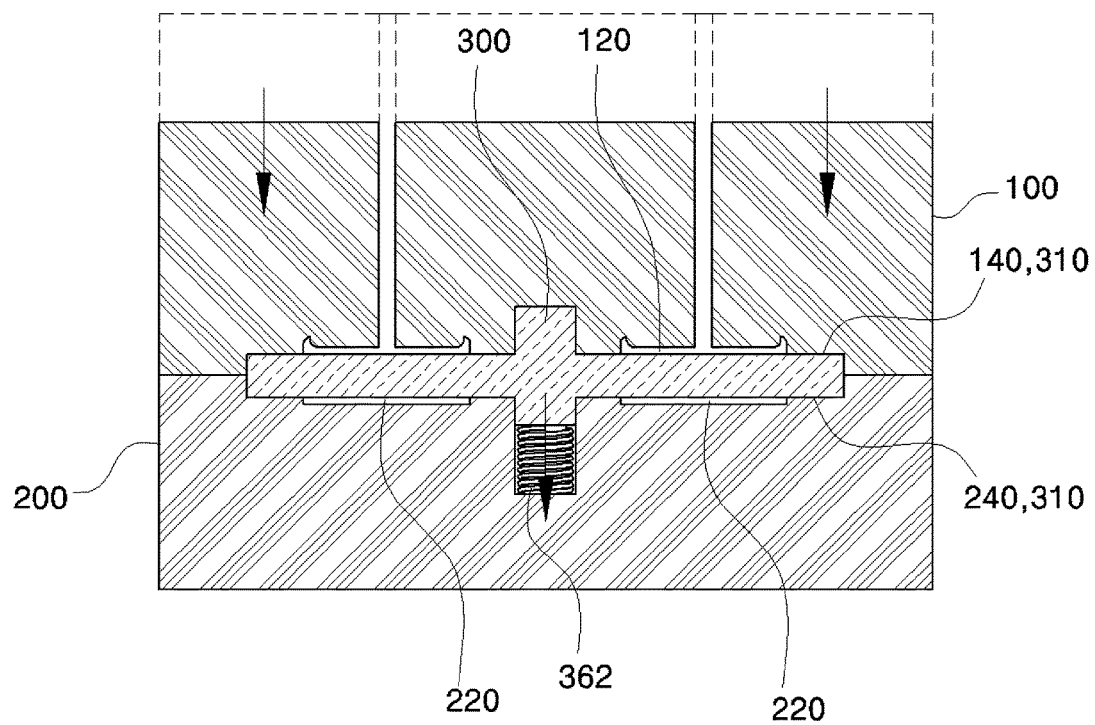
Figure 7:
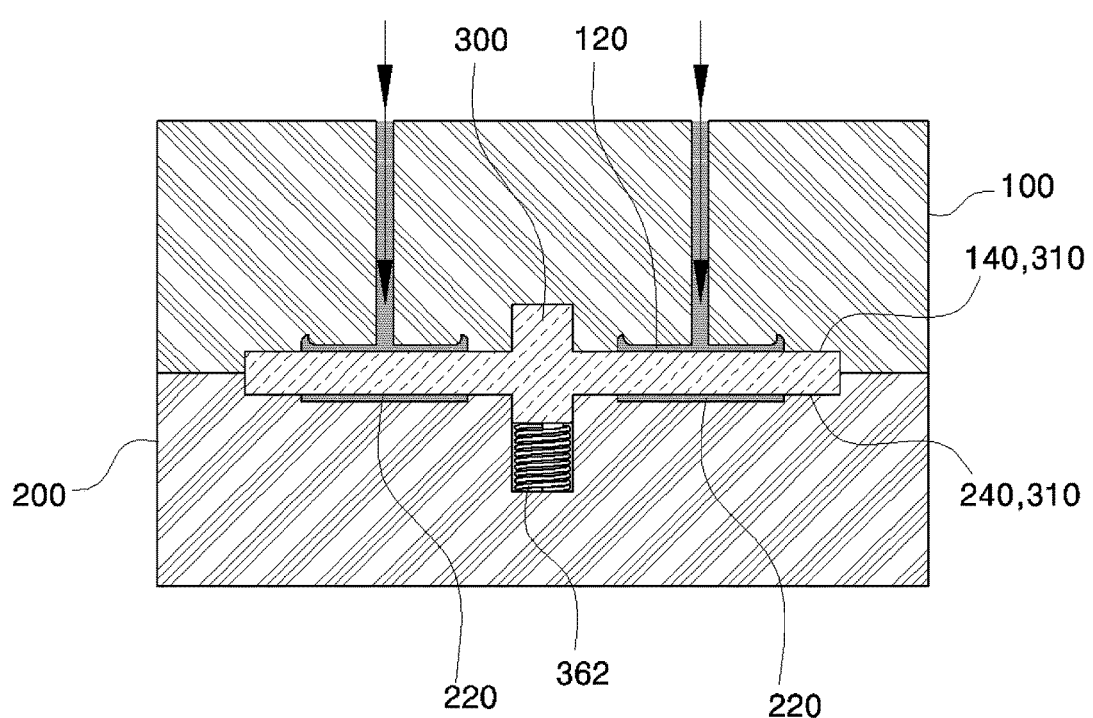
Figure 8:
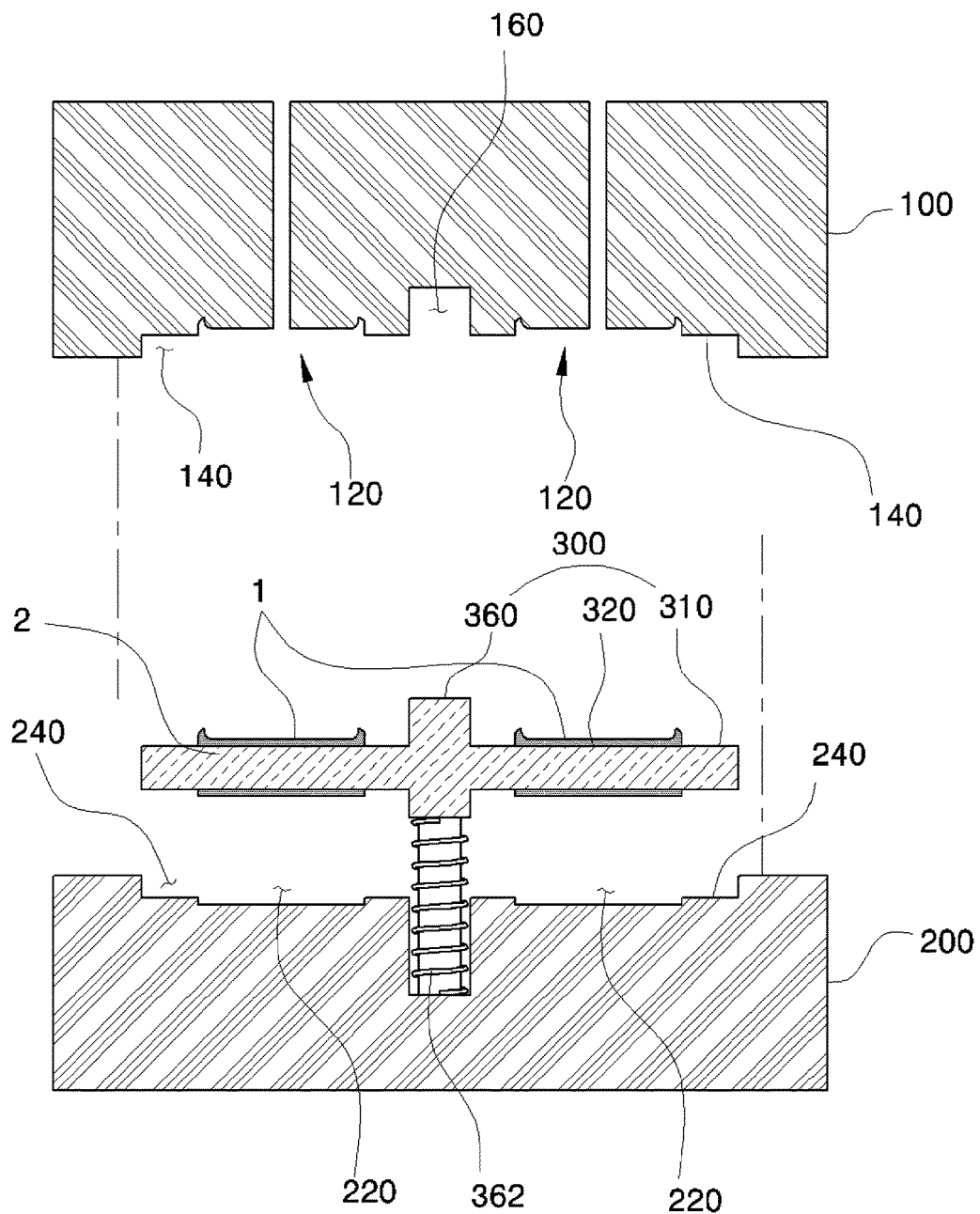
Figure 9:
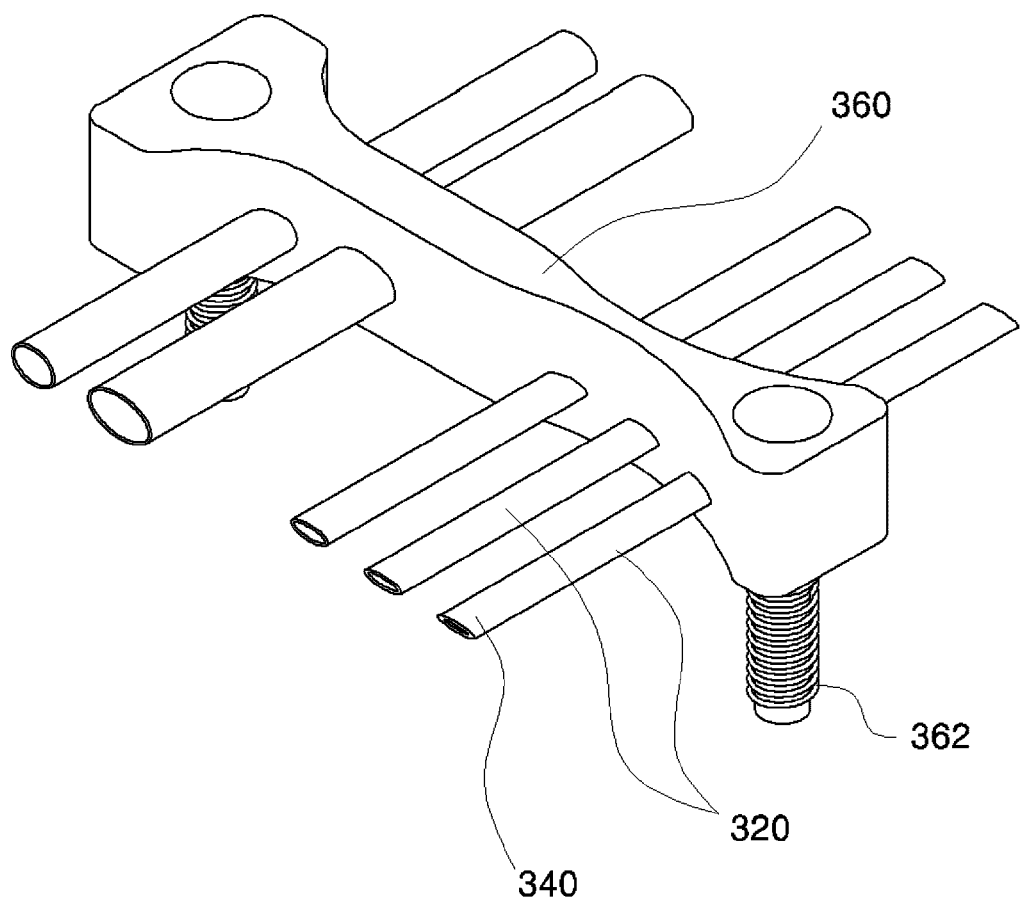
FIGS. 9 and 10 are perspective views illustrating a shaft mold according to another embodiment of the present invention.
Figure 10:
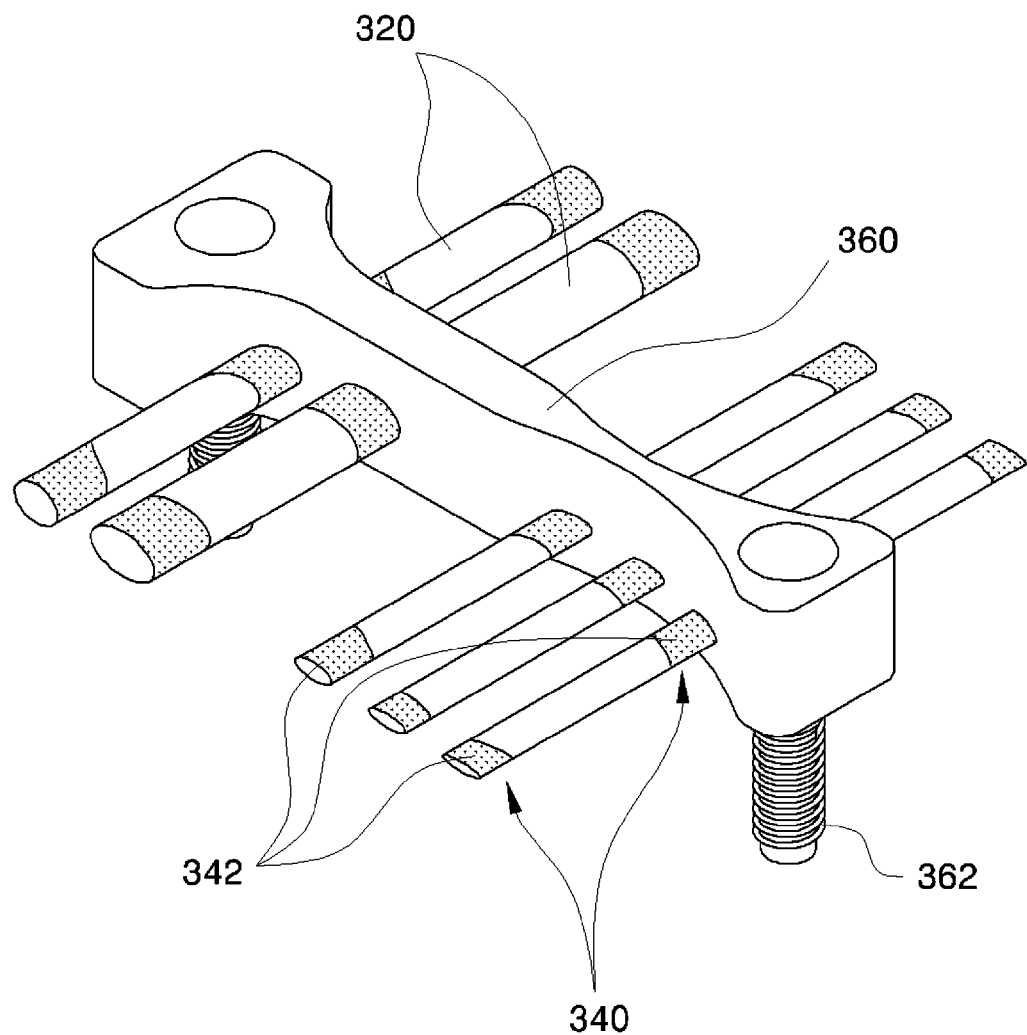
Figure 11:
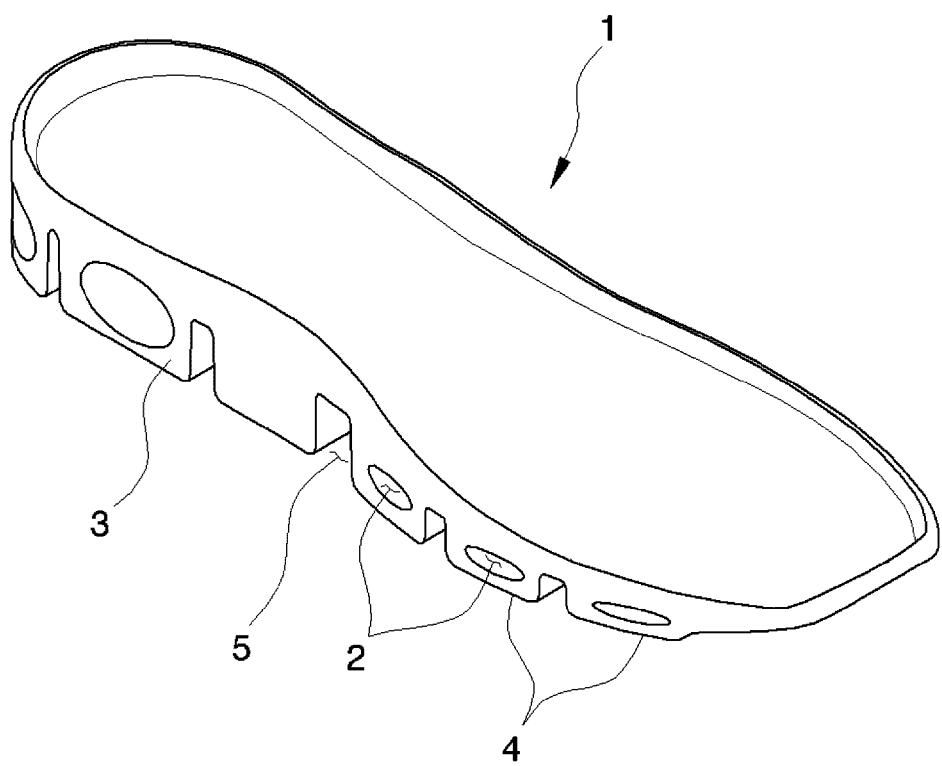
FIGS. 11 to 14 are views illustrating a midsole manufactured by a midsole forming device according to an embodiment of the present invention.
Figure 12:
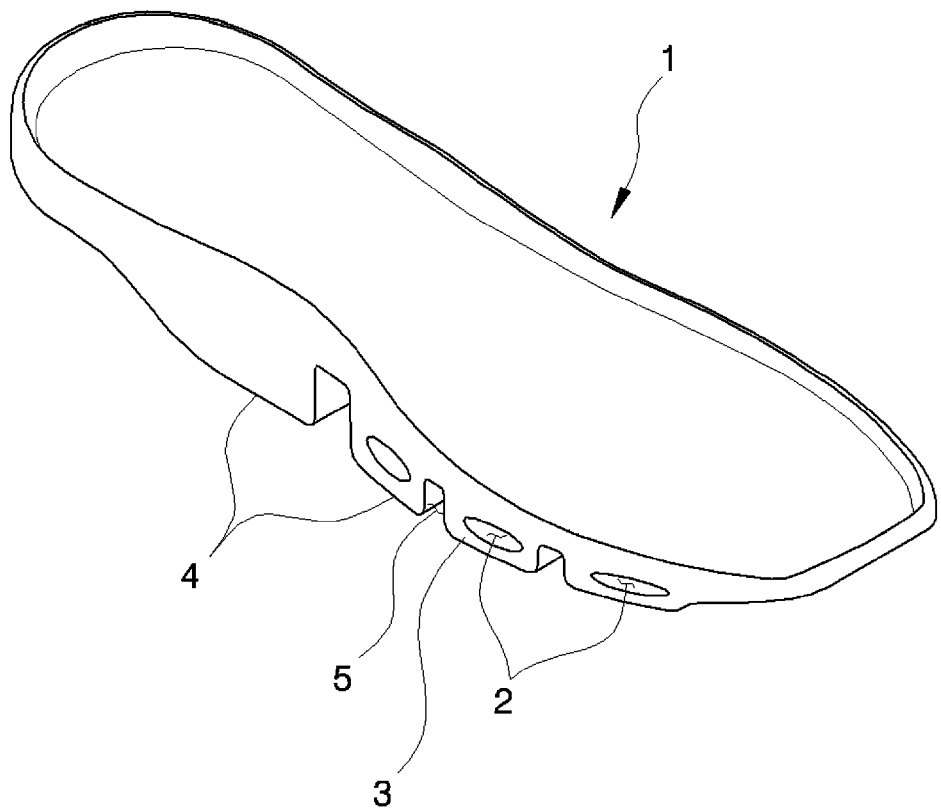
Figure 13:
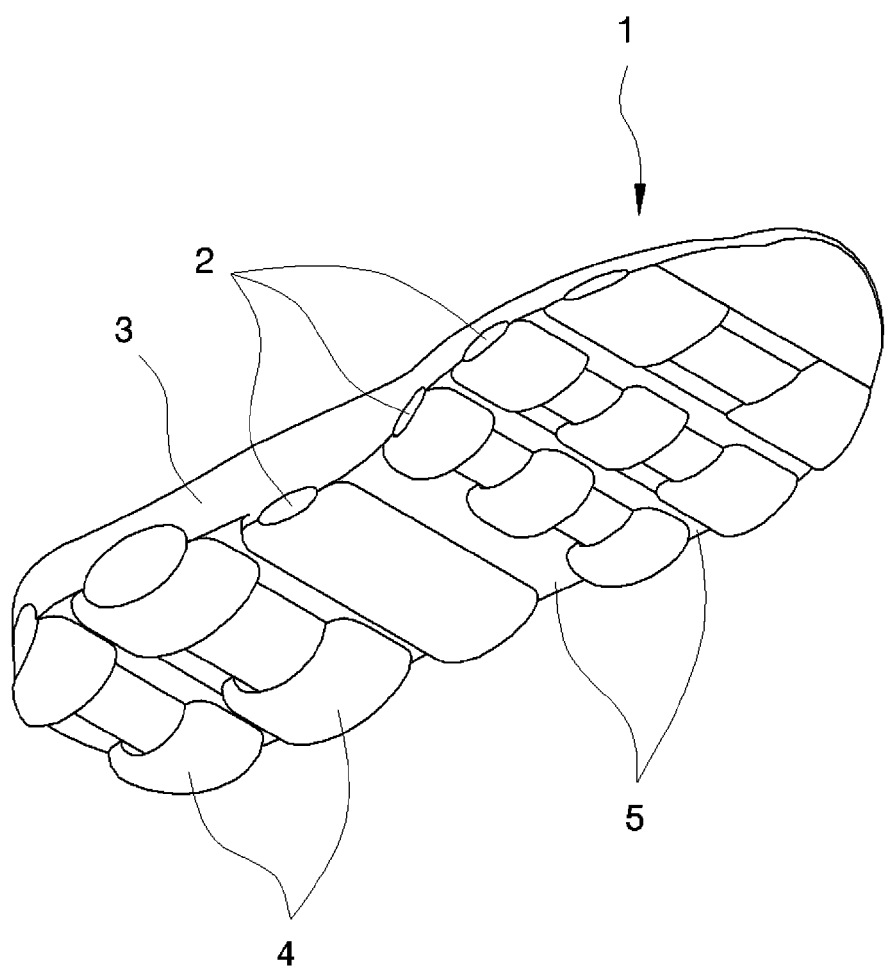
Figure 14:
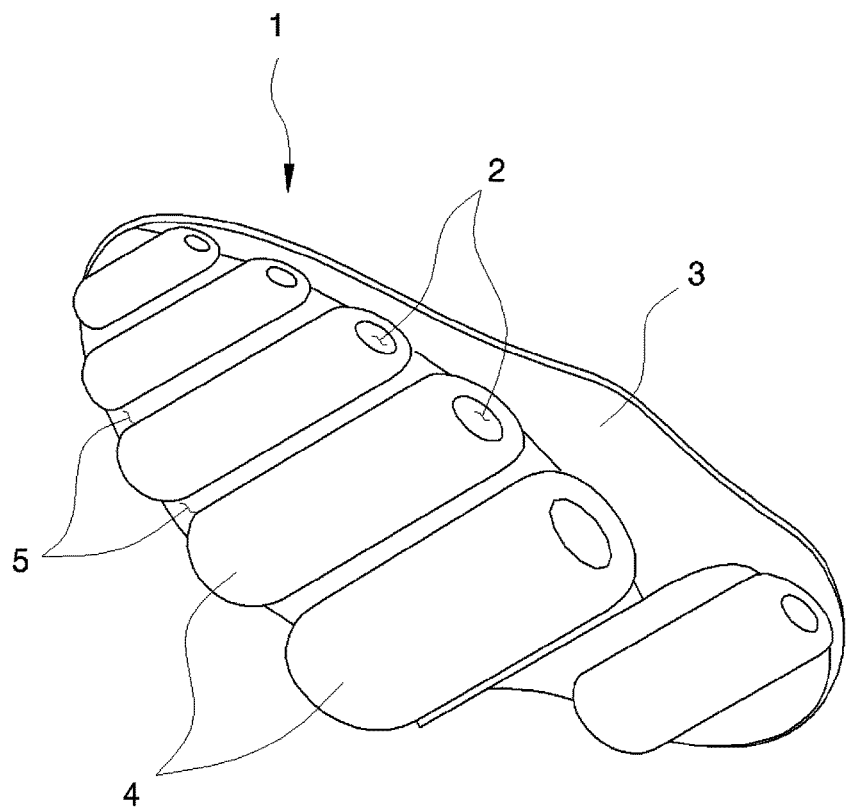
Figure 15:
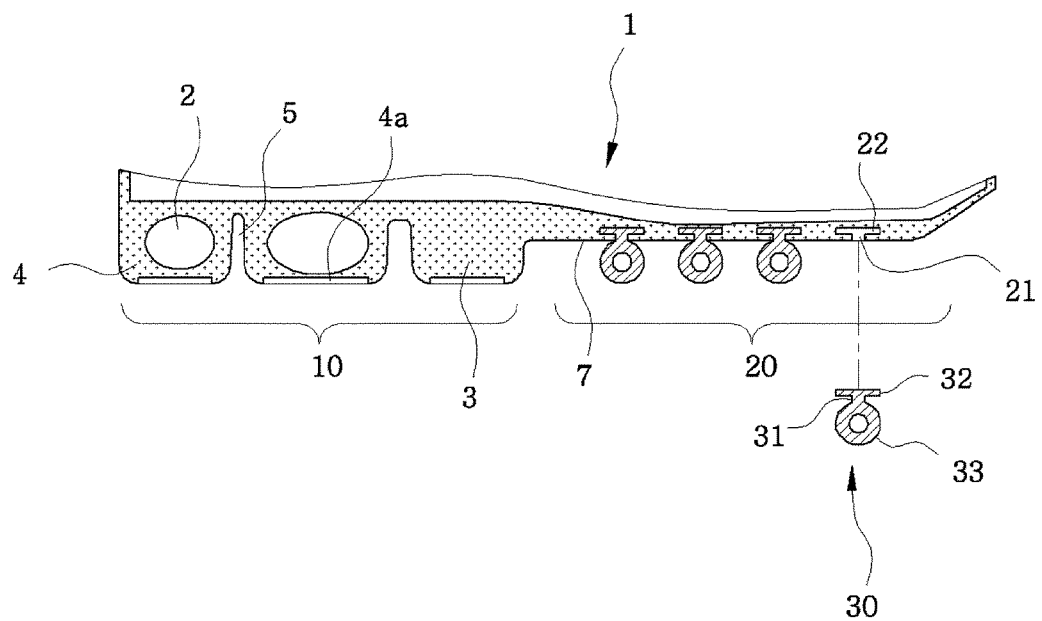
FIGS. 15 to 21 are views illustrating a midsole manufactured by a midsole forming device according to another embodiment of the present invention.
Figure 16:
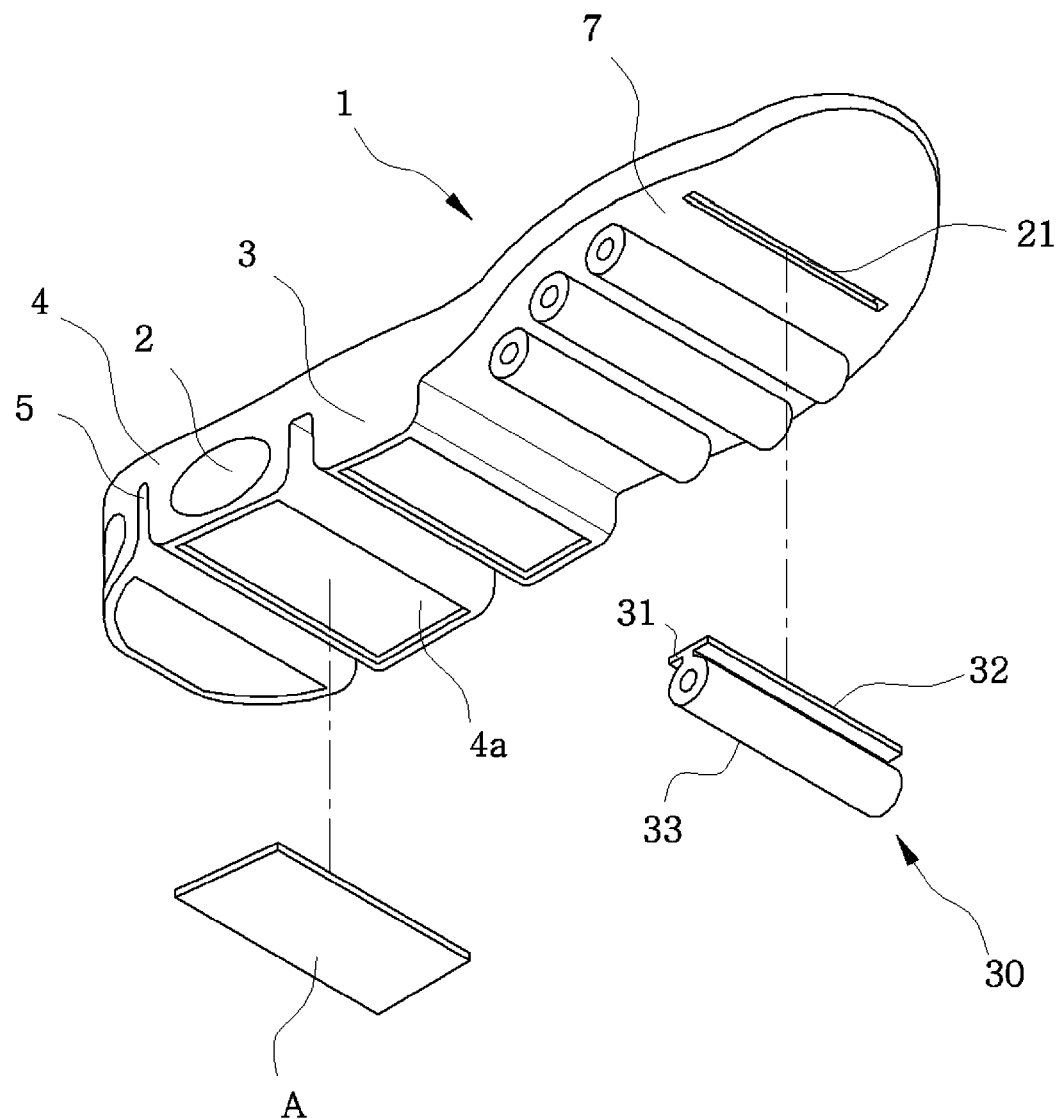

FIGS. 4 and 8 are sectional views illustrating a sequence of manufacturing a midsole according to the present invention. To injection-mold the midsole 1, after the upper and lower molds 100 and 200 are closed to be shut and closed, a raw material is injected into the mold to perform injection molding. In the state where the raw material is injected, the chemical reaction occurs in the mold so that the raw material is molded while being foamed. When the mold is opened after a set time, the molded article is separated from the upper and lower molds 100 and 200 while the platform 360 of the shaft mold 300 is ejected, so that the molded article is cooled while being expanded, so the manufacture of the midsole is completed.

In this embodiment, the platform 360 is mounted on the lower mold 200 to move up and down, and the upper and lower molds 100 and 200 are respectively provided with receiving grooves 160 and 260 to enable the platform 360 to enter the upper and lower molds 100 and 200, respectively, but the present invention may be variously modified depending on the productivity or the manner of opening and closing the upper and lower molds.

In addition, the upper and lower molds 100 and 200 are preferably formed with one pair of inner spaces 120 and 220 to enable a pair of midsoles to be simultaneously fabricated. To this end, the shaft mold 300 may be formed with shafts 320 having extension portions 340 and symmetrically formed at both sides of the platform 360, and the upper and lower molds 100 and 200 may be formed symmetrically with press grooves 140 and 240 which are symmetrically formed to receive the extension portions 340 of the symmetrical shafts, so that a pair of midsoles 1 may be simultaneously manufactured under a same molding condition.

That is, according to the injection foam molding method, the size, weight, and elasticity of the molded article may be changed depending on the minute difference in the molding conditions such as the injection amount of the raw material, the temperature difference, the density, and the like. In addition, the pair of midsole 1 may be simultaneously molded by providing the shaft mold 300 on both sides of one platform 360, so that a pair of midsoles having no deviation may be manufactured.

In addition, when the shaft 320 formed on the platform 360 is formed of a hollow tube, the adhesion of the upper and lower molds to the press grooves 140 and 240 may be further improved by the elastic force of the shaft 320 itself. When the foam molding is performed in the state that the upper and lower molds 100 and 200 and the shaft mold 300 are closed, the raw material may be further prevented from being leaked through the gap between the molds due to the foaming pressure.

In addition, the extension portion 340 may be provided with a coating layer 342 on the surface thereof to improve the adhesion strength with the press grooves 140 and 240.

The surface of the coating layer 342 may be Teflon-coated to improve the adhesion strength, or may be formed with metal or special plastic, thereby improving the adhesion strength with the press grooves 140 and 240.

Hereinafter, the midsole according to an embodiment manufactured by using the midsole foaming apparatus will be described in more detail with reference to FIGS. 11 to 14.

The midsole 1 of the present invention may be formed through injection-foam-molding by injecting various kinds of synthetic resins capable of foaming into a mold as raw materials. It is preferable to use a thermosetting synthetic resin as a raw material of the midsole.

The midsole 1 is provided with a plurality of through-holes 2 perforated in the lateral direction in order to have a buffering force and is molded without any parting lines and burrs in the peripheries of the through-holes 2 as well as the inner walls of the through-holes 2 to allow the through-hole to have a beautiful outer appearance.

That is, when the molding is performed while the mold 300 is engaged between the upper mold 100 and the lower mold 200 in the above-described molding apparatus, since the extension portion 340 of the shaft mold 300 is inserted into the press grooves 140 and 240, the raw resin may be basically prevented from being leaked to the inlet of the through-hole 2 due to the foaming pressure. In addition, since the upper and lower surfaces of the extension portion 340 are strongly pressed by the press grooves 140 and 240 to be in close contact with each other and the area of the tightly closed surface is large, even when the foaming pressure is strongly inside the mold, the raw material may be prevented from being leaked and the quality of the molded article may be improved.

In addition, a plurality of protrusions 4 and an inlet portion 5 are repeatedly formed on the lower surface of the midsole 1 such that the midsole 1 may move flexibly. The protrusion 4 is formed with the through-hole 2, such that the buffering capacity of the midsole may be further improved.

In this case, the protrusion portion 4 may protrude in a hemispherical ball shape.

When the heel portion of the midsole 1 is inclined inwardly in an arcuate shape for the purpose of stepping on the ground during walking, the inclined surface of the heel first touches the ground and pulls the back muscles in the walking step. In the next walking step, while the weight is tilted forward when the toes step on the ground, the entire muscles of the leg are pulled and pressed while the body weight is moved forward, so that the walking exercise effect may be improved and balanced walking may be achieved.

In addition, as shown in FIGS. 15 to 21, another midsole which may be formed by the molding apparatus of the present invention is as follows.

The midsole 1 includes a heel portion 10 located rearward of a support 3 capable of pressing a concave portion of the sole and a toe portion 20. The midsole 1 is foam-molded to realize a low weight. The heel portion 10 of the midsole 1 is formed to be relatively thicker than the toe portion 20 to endure a load when the shearing force is applied during walking.

In addition, the heel portion 10 is formed with repeating recess portions 5 and protrusion portions 4. The protrusion portion 4 includes a through-hole 2 perforated in the lateral direction for damping. The toe portion 20 includes an assembly means for assembling a damping ball 30 which is separately molded in a planar state.

The recess portions 5 and protrusion portions 4 repeatedly formed on the heel portion 10 of the present invention are preferably spaced apart from each other by a degree that the protrusion portion 4 is deformed back and forth while being crushed by the load caused by the generation of the shearing force during walking. Such an interval may allow the shearing force during walking transferred from the heel to the toe during walking to be easily operated.

By forming the protrusion portion 4 to be larger than the recess portion 5, the through-hole 2 perforated in the lateral direction for damping may be easily formed. In addition, it is possible to stably walk when the heel portion steps on the ground at a starting of walking.

In addition, an inner groove 4a for mounting an outsole A is formed on the bottom surface of the protrusion portion 4. The inner groove 4a allows the outsole A to be easily mounted and is formed at such a depth that the midsole 1 does not produce friction against the ground when the outsole A is in close contact with the ground.

Although the through hole 2 is formed on the protrusion portion 4 for damping according to one embodiment of the present invention, the same object may be achieved even when the damping means is implemented by another method.

In addition, the damping ball 30 according to the present invention mounted on the assembly means of the toe portion 20 may be formed of a rubber material which is not easily damaged even when the damping ball 30 is in direct friction against the ground during walking, so that it may be not required to install a separate outsole.

The rubber material in the present invention means a material which is excellent in friction and does not easily worn away. Various materials having such functions may be used.

In addition, when the damping ball 30 is mounted on the toe portion 20 of the midsole 100 by assembling it, to secure the excellent quality as well as the easiness of mounting and the rigidity in the mounted state, the assembly means is formed with an opening hole 21 formed in the bottom surface corresponding to the toe portion 20 of the midsole 1 and support grooves 22 formed in either one side or both sides of the upper end of the opening hole 21.

In addition, the damping ball 30 includes a support shaft 31 formed on an upper end of a ball 33, which is tightly closed to a ground, to be tightly closed to an opening groove and a adhesion wing 32 formed on one side of two side of an upper end of the support shaft 31, such that the support shaft 31 and the adhesion wing 32 are tightly fitted into the opening hole 21 and the support groove 22 constituting the assembly means.

Although one embodiment of the ball 33 shown and described in the present invention is described as a perforated member penetrating through one side, the perforated member in the present invention may have excellent resilience in a collapsed state and these functions may be used in various forms possible.

In addition, the damping ball 30 includes two support shafts 31a and 31b to enhance supporting force and to make the damping ball 30 closer to the bottom surface of the midsole in a state that the damping ball 30 is mounted on the assembly mean of the midsole. The support shafts 31a and 31b are spaced apart from each other by a predetermined distance such that the support shafts 31a and 31b are formed at left and right sides of the ball 33 having a through-hole, respectively. An adhesion wing 32, which spreads outward from each of the support shafts 31a and 31b, is provided, so that the ball 33 of the damping ball 30 is positioned closer to the bottom surface 7 of the midsole 1, thereby realizing a sense of security when worn and providing excellent supportability with the ground in the assembled state.

According to the present invention, the opening groove 21, which is formed to be opened upward from the bottom surface 110 of the midsole 1, may be spaced apart from the bottom surface of the toe portion of the midsole 1 by a predetermined distance. However, it is required to form the opening groove at a constant depth α. In this case, if possible, the depth α of the opening groove 21 is equal to or deeper than a length β of the support shaft 31 such that the damping ball 30 may be tightly closed to the bottom surface 110 of the midsole 1 by allowing the support shaft 31 to fixedly adhere into the opening groove 21 in a state that the support shaft 31 is extended.

Figure 17:
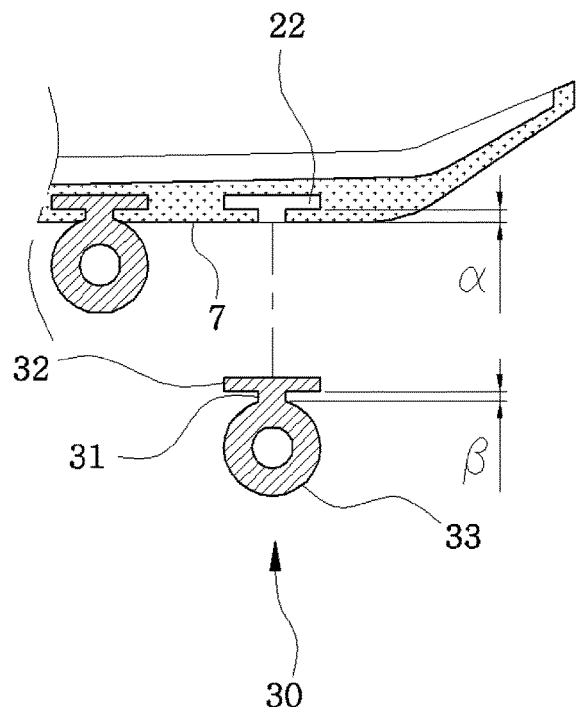

Thus, as shown in FIG. 17, when the damping ball 30 adheres to the midsole 1 by expanding the support shaft 31 of the damping ball 30, of course, pressing force is generated in the adhesion state, so that the adhesion strength may be enhanced and the tight adhesion of the support shaft 31 with the bottom surface 7 of the midsole 1 may be excellent.

Thus, various shoes may be designed according to the size and arrangement of the damping balls 30 on the bottom surface of the midsole, and various functional shoes may be provided by the hardness difference of the damping balls.

Figure 18:
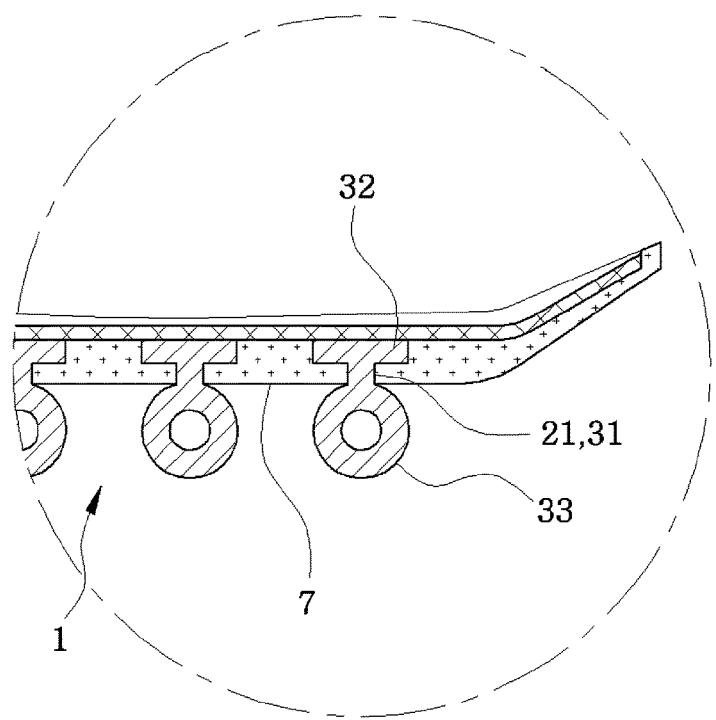

FIG. 18 is a view showing the damping ball 30 having the support shaft 31 and the adhesion wing 32 which fixedly adheres to the bottom surface of the midsole 1 according to another embodiment of the present invention, where the upper surface of the midsole 1 is opened to facilitate assembling work in a state that the opening holes 21a and 21b and the support groove 22 are formed, and an insole B is provided on the upper surface of the midsole 1 as an essential element in a state that the adhesion wing 32 fixedly adheres to the support groove 22 after assembling.

That is, the upper surface of the bottom surface of the midsole 1 in which the opening holes 21a and 21b and the receiving groove 22 are formed is opened, so that the supporting shaft 31 of the cushioning ball 30 and the adhesive blade 32 may improve the easiness of fitting assembly.

Figure 19:
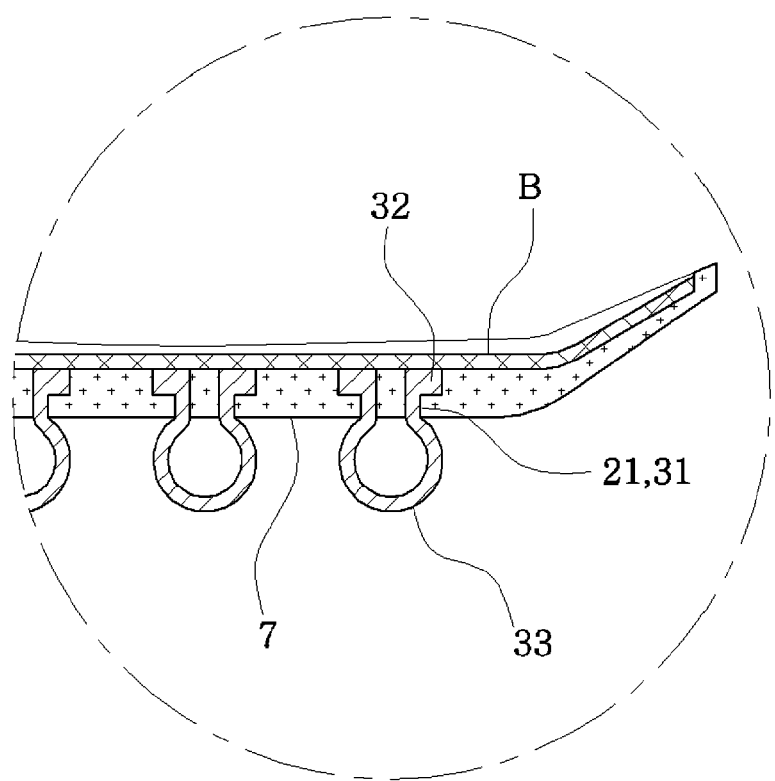

As shown in FIG. 19, according to the present invention, the midsole includes two opening holes 21a and 21b by opening the bottom surface of the midsole 1 for coupling the damping ball 30 including two support shafts 31a and 31b. The support groove 22 communicating with the opening holes 21a and 21b is formed outside each of the opening holes 21a and 21b. The reinforcing shafts 23 are formed at each center of the opening holes 21a and 21b to enhance a support force of the support shafts 31a and 31b spaced apart from each other.

The reinforcing shafts 23 are provided to enhance support and adhesion forces of the support shafts 31a and 31b while the two support shafts 31a and 31b formed on the damping ball 30 are spaced apart from each other. The reinforcing shafts 23 are provided with sealed through-holes to allow the damping ball 30 having the two support shafts 31a and 31b to have elasticity.

Figure 20:
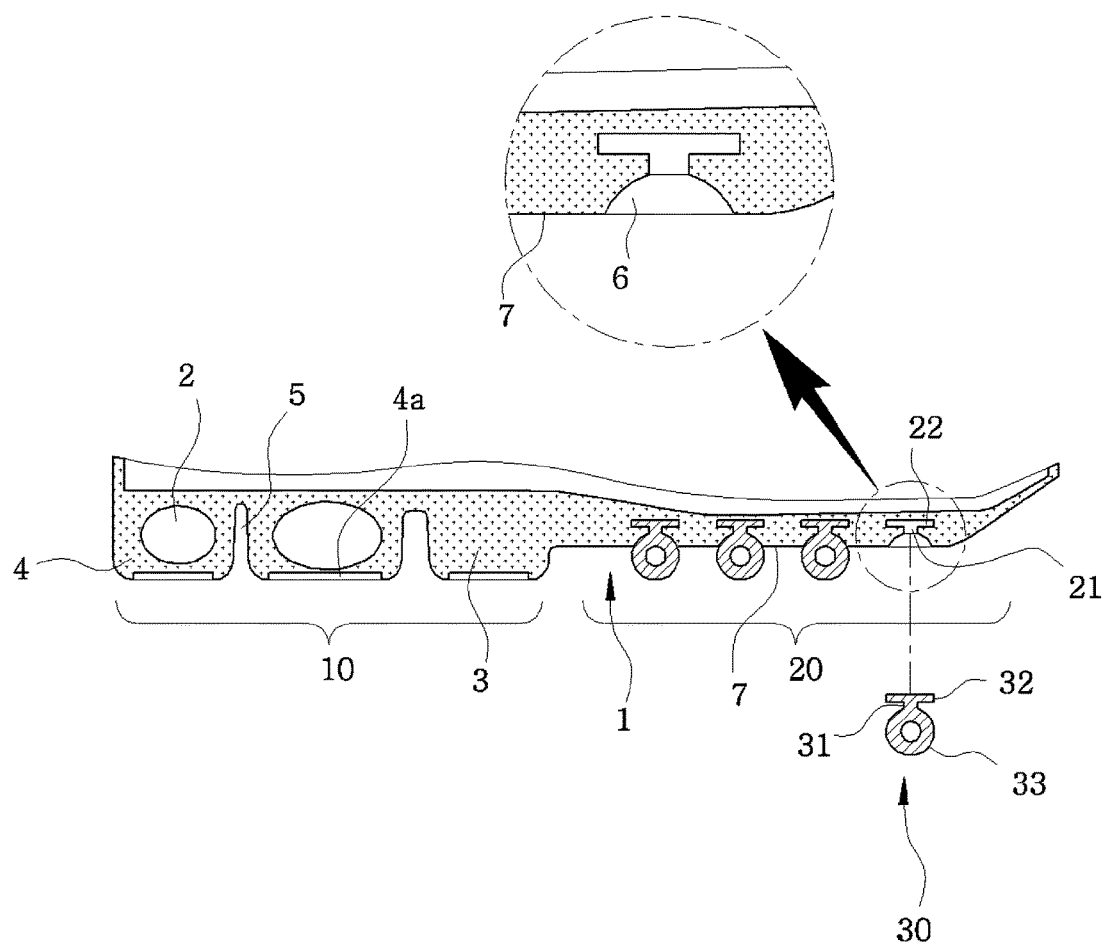
Figure 21:
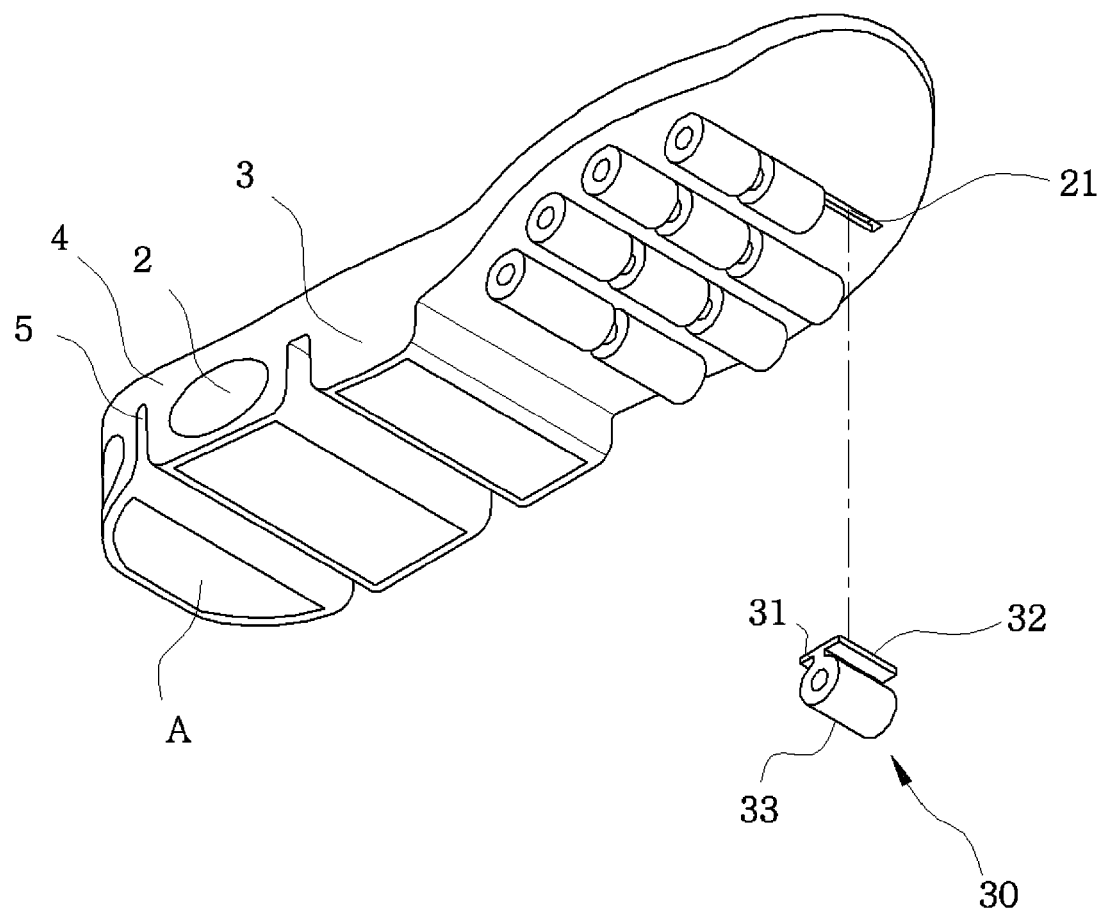

FIG. 20 is a view showing an embodiment in which the elastic direction of the cushioning ball is maintained as the forward direction during the elastic operation and the midsole is slim. Curved grooves 111 are further provided outward of the opening holes 21a and 21b formed on the bottom surface 110 of the midsole 100 such that an upper portion of a ball 33 of the damping ball 30 is partially inserted into the bottom surface 110 of the midsole in a state that the damping ball 30 is coupled to the midsole 100. An upper end of the ball simultaneously adheres to the curved groove 111 in a state that the support shafts of the damping ball are fitted into the opening holes 21a and 21b. The support shafts of the damping ball are prevented from being tilted left or right even when the damping ball is subject to twisting due to a sudden change of force applied to the damping ball 30 in a state that a user wears a shoe having the midsole 1 and it is possible to make the midsole slim.

In addition, according to the present invention, the curved groove 6 is equally applicable to even the case where the opening holes 21a and 21b are a single number or a pair.

In addition, the thickness of the support shaft 31 of the damping ball 30 and the size and elasticity of the ball 33 of the damping ball 30 are variously selected to allow the midsole 1 to be suitable for various types of shoes so that the productivity may be improved and the cost may be reduced.

For example, the damping ball 30 may be assembled in a block type on a predetermined portion of the bottom surface 110 of the midsole (100). The ball 33 of each damping ball 30 having a strong resilience may be attached to an outside of the midsole to correct a splay-footed step and to an inside of the midsole to correct a pigeon-toed step, such that incorrect steps are naturally corrected during walking.

This is proposed as one embodiment, and it is possible to provide a shoe without a heel when the sizes of the balls of the damping ball are different from each other. When applying the midsole to a slippery shoe, it is possible to provide various types of midsole as well as ankle stretching.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A midsole molding apparatus comprising:
   an upper mold (100);
   a lower mold (200);
   a plurality of inner spaces (120 and 220) formed by the upper mold (100) and the lower mold (200) in a closed state, in which a shaft is positioned in the plurality of inner spaces and a through hole is perforated in a lateral direction of a midsole by the shaft when the midsole is formed through a foaming injection by injecting a raw material into the plurality of inner spaces;
   a shaft mold (300) provided in the lower mold (200), the shaft mold (300) includes a platform (360) for moving up and down by a restoring element when the upper and lower molds (100 and 200) are closed and opened, and a plurality of shafts (320) form a pair of midsoles at left and right of the platform and form the through hole perforated in a lateral direction of the midsole;
   a receiving groove (160) formed in the upper mold for receiving the platform (360), the shaft mold (300) is provided between the upper mold (100) and the lower mold (200) when the upper and lower molds are in a closed state; and
   a plurality of extension portions (340) formed in the shafts (320) such that a length of the shafts (320) exceeds a boundary of the plurality of inner spaces (120 and 220) of the upper and lower molds (100 and 200) where the midsole is molded,
   wherein the upper and lower molds (100 and 200) are formed with press grooves (140 and 240) to fixedly surround only the plurality of extension portions (340) of the shaft mold (300) when the upper and lower molds (100 and 200) are in a closed state, and
   wherein the shafts (320), which extend leftward and rightward from the platform of the shaft mold having the plurality of extension portions (340), include a hollow structure with an elastic property to enhance adhesion strength against the press grooves, so an injection foaming process is performed without generating parting lines and burs on an inner surface of the through hole which is perforated in the lateral direction.

2. The midsole molding apparatus of claim 1, further comprising:
a Teflon coating layer (342) overlapped on the plurality of extension portions (340), which extend from the shafts, to enhance adhesion strength against the press grooves (140 and 240) and to maintain surface tightness.

* * * * *